Oct. 18, 1955

J. B. LINDON

METHODS AND ARRANGEMENTS FOR CARRYING OUT POSTCARD BILLING OPERATIONS AND THE LIKE 2,720,833

Filed Aug. 13, 1954

6 Sheets-Sheet 3

Oct. 18, 1955

J. B. LINDON 2,720,833

METHODS AND ARRANGEMENTS FOR CARRYING OUT POSTCARD BILLING OPERATIONS AND THE LIKE

Filed Aug. 13, 1954

6 Sheets-Sheet 4

Oct. 18, 1955 J. B. LINDON 2,720,833

METHODS AND ARRANGEMENTS FOR CARRYING OUT POSTCARD BILLING OPERATIONS AND THE LIKE

Filed Aug. 13, 1954 6 Sheets-Sheet 6

United States Patent Office 2,720,833

Patented Oct. 18, 1955

2,720,833

METHODS AND ARRANGEMENTS FOR CARRYING OUT POSTCARD BILLING OPERATIONS AND THE LIKE

Joseph B. Lindon, Brooklyn, N. Y., assignor to Consolidated Edison Company of New York, Inc., New York, N. Y., a corporation of New York Application August 13, 1954, Serial No. 449,636

12 Claims. (Cl. 101—93)

This invention relates to methods and means for printing information on one surface of a sheet or card, for example figures denoting quantities and charges therefor to be billed to a customer, while substantially concurrently or as a part of the same operation, printing other information, such as the customer's name and address, on the reverse surface of the sheet or card.

This application comprises a continuation-in-part of applicant's copending application Serial No. 335,094, filed February 4, 1953, now abandoned, and the benefits of the filing date of that application are claimed as to all subject matter hereof common to that application.

The invention is particularly adapted, among other possibilities, for use in connection with accounting machines as set up to print bills for gas and electricity or other purposes on postcards, while as a part of the same operation, printing the name and address of the customer on the reverse surface of the card.

It has become common practice for some utility companies, among other types of organizations, to use accounting machines for printing bills to be sent to their customers on the back surface of postcards or on a continuous web which is separable into individual cards which will be mailed as postcard bills. That is, stacks of punched record cards are fed into such accounting machines, such cards having punch holes arranged to identify the customer and other punch holes representing the previous and present meter readings or other quantities, and the machine, upon sensing such perforations, automatically types out on the desired postcards the corresponding information, together with the charges to be made, including the total charge as computed by the machine. Such information is printed on what will herein be referred to as the "back" surfaces of the postcards, and in order to print the names and addresses of the customers on the "front" surfaces of such cards as required, it has been the usual practice to run the cards through the accounting machine again (or through another accounting machine) as a separate operation, while the stack of cards bearing the punched holes indicative of the names and addresses are being fed through the machine. This practice not only requires using the accounting machine for a substantially longer time to print a given number of bills, but also incurs the possibility that the correct names and addresses of the customers will not be applied to the proper bills.

With the present invention, a method is provided whereby standardized well-known types of accounting machines may easily be set up and arranged to print the name and address on the front of the cards during the same operation while the bill data is being printed on the back of each card. Thus the making out of each bill and the addressing of same may be accomplished on the same machine during an interval of time which is little longer than heretofore required for typing the bill without addressing same, and the dangers of addressing bills to the wrong customers are substantially eliminated. Furthermore, in accordance with the invention, these advantages, if desired, may be accomplished without altering the usual construction of certain well-known types of electrically operated accounting machines, except to the extent of simply replacing certain of the type bars or type wheels by others with a modified arrangement of letters and figures thereon. Such accounting machines are customarily provided with numerous interchangeable plug and socket connections on a control panel or plug board, whereby the holes on the punched cards as sensed by the machine will properly actuate the accounting mechanism and operate the desired type wheels or type bars in a proper manner for translating the punch holes into typed information with the typing arranged in the particular manner and place desired on the resulting printed web or postcards. It will also be necessary in carrying out the invention to make certain rearrangements of the plugs in such plug boards for reasons hereinafter explained, but this may readily be done by the machine operators without any structural changes on the standard accounting machines. Furthermore, these objects may be accomplished while operating the accounting machine to its full advantage in printing the billing data.

In carrying out the novel method, either cards on which the bills are to be printed are fed through the accounting machine, or a continuous web separable into the individual postcard bills, is fed through the machine. The billing data is printed on the back surfaces of the cards or web at any preferred locations and in the usual way. But the cards or webs as they pass through the machine are backed up by a sheet having what will be termed "reversed carbon areas" contacting those local areas on the front of the cards or webs where the customers' names and addresses are to be printed, or instead a reversed carbon ribbon or strip may be used with a suitable accompanying masking strip having apertures at proper intervals enabling only the name and address impressions to be imprinted on the front of the cards. And certain of the type on the type wheels or type bars on the machine, which are to strike against the back surfaces of the cards or webs at the name and address areas, are formed with the letters of the alphabet as well as the numerals 1 to 9 inclusive, shaped in accordance with the mirror image or reverse of the orthodox type customarily used for ordinary printing of such letters and numerals, and hence when the particular type so shaped strikes against the back surfaces of the cards or webs, the impressions will be transmitted therethrough with the result that the above-mentioned reversed carbon areas (or reversed carbon ribbon) cause the corresponding letters and numerals which are to represent the customer's name and address, to be printed for reading in the usual way on the front surfaces of the postcards. The plugboard is also so rearranged that the punched card holes which control the actuation of such altered type, will do so in a manner whereby the name and address characters as printed (in reverse) on the back of the postcards, will run from right to left, but the carbon impressions thereof as read normally on the front of the postcard will be readable in a normal way from left to right.

The reversed carbon ribbon or strip is preferably continuous in form and may be driven in various ways to pass around the platen or a separately driven portion thereof, and to advance the ribbon from time to time as necessary when each address area comes into position, so that the type impacts do not repeatedly impinge upon the same particular areas of the carbon but the carbon is progressively advanced so that all areas thereof progressively are efficiently used, in a way similar to the case of typewriter ribbons.

The invention in one of its forms also may include means for masking the usual ink ribbon of the machine or shifting such ribbon to bring an uninked portion thereof into screening position at times when the name and address characters are being printed so that the name and address impressions will not be printed or show on the backs of the cards, but only on the fronts thereof in the form of carbon impressions.

The invention will be described as applied to an accounting machine of the form which prints on a continuous web and having type wheels, and which is provided with type for the complete alphabet as well as numerals and the customary "arbitrary signs" (such as $, %, etc.), for example such as the widely used 407 type International Business Machines Corp. accounting machine. But it will be understood that the invention is equally applicable for use in connection with accounting machines of the type which have vertically reciprocating type bars instead of type wheels. The invention may also be applied to numerous other forms of machines by appropriately changing some of the type, or to machines of the form which print the characters from reeds or wires. The type wheels, type bars or other character forming elements, will be herein sometimes referred to as type carrier means or members.

Oftentimes some of the billing numerals as printed on the back surface of a postcard preferably will be vertically in alignment with the location of certain of the name and address characters (including house numbers) which are to be typed on the front of the card, and accordingly the same type carrier means will have to be used for both purposes if standard forms of machines are to be used. Yet, the numerals of the billing data will have to be of orthodox type, whereas the numerals for printing the house numbers have to be of said mirror image or reverse type. This difficulty may be readily overcome in adapting the invention to the above-mentioned 407 form of accounting machine among others, by using new or substitute type carrier members on which the billing data numerals remain in standard form at the customary places for operation in conjunction with the accounting mechanism in the usual way, whereas all of the alphabetical characters on the new type carrier members are of the reverse unorthodox form, although in the standard locations, and nine of the arbitrary sign type elements are replaced by reversed or unorthodox numerals 1–9 inclusive, for printing the house numbers.

Other and more specific objects, features and advantages of the invention will appear from the detailed description given below, taken in connection with the accompanying drawings which form a part of this specification and illustrate the novel features of the invention in one of its preferred embodiments.

Figure 5:
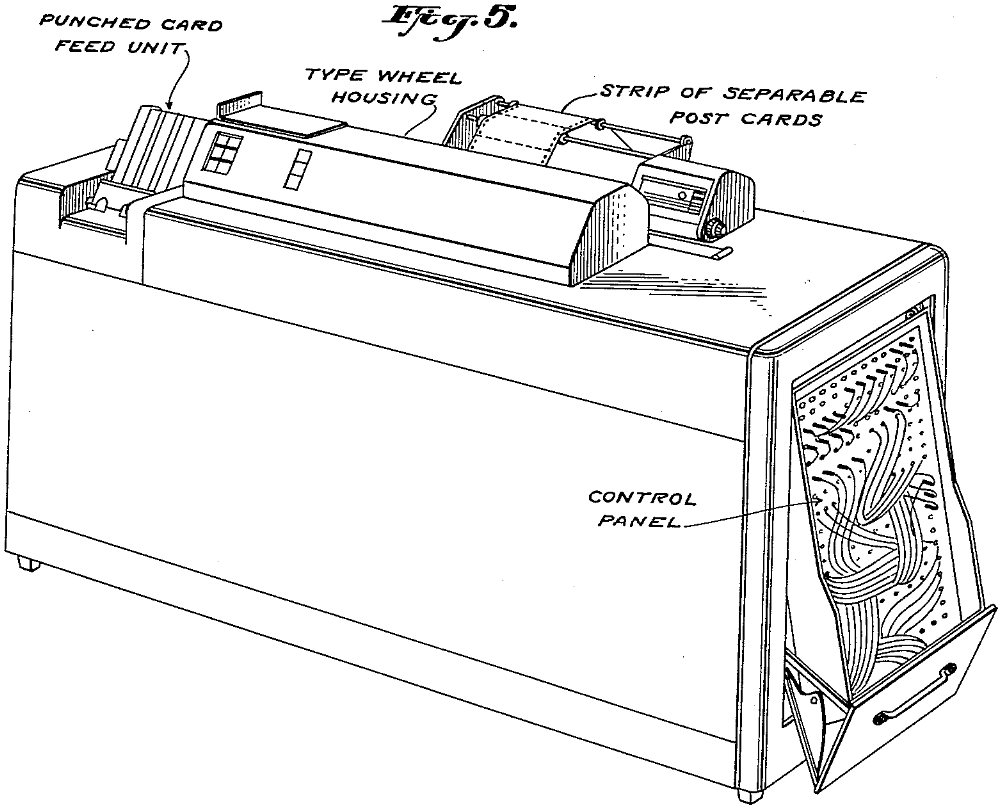
Fig. 5 is a perspective view showing the exterior of one of the above-mentioned 407 type of accounting machines.
Figure 6:
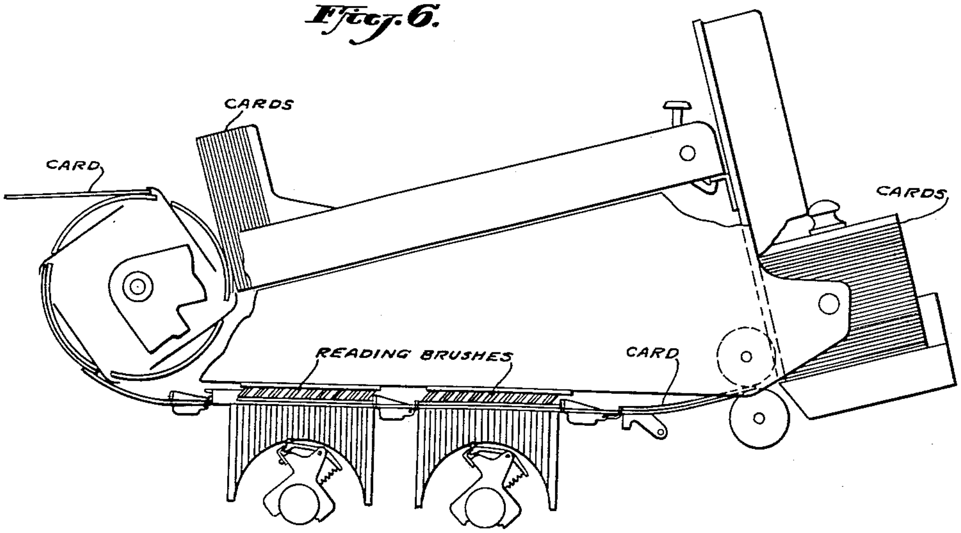
Fig. 6 is an end view somewhat schematically showing the feed unit for such a machine, for feeding the punched cards and "reading" same to actuate the accounting machine.

The well-known 407 type of accounting machine, as above referred to, and as will be noted from the exterior perspective view thereof in Fig. 5, includes a cabinet for the operating mechanism, a feed unit for the punched cards, a control panel or plugboard, for adjusting the electrical circuits whereby predetermined perforations and arrangements thereof on the punched cards will cause predetermined type contained in the type wheel housing, to be actuated to imprint the desired information on the postcard strip as the latter is being fed through the machine. The punched card feed unit, as shown schematically in further detail in Fig. 6, as well as the other conventional features of this type of machine, need not be further described as same are well known.

Figure 1:
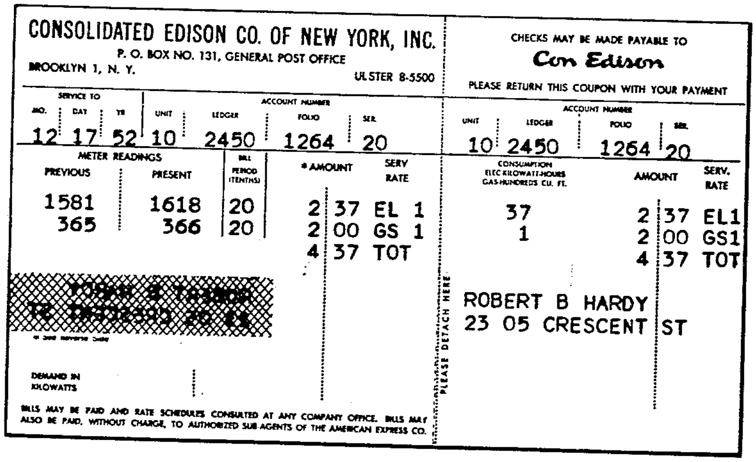
Fig. 1 is a view of the "front" surface of a typical postcard bill with the customer's name and address printed in accordance with the invention.

The typical postcard bill, typed in accordance with the invention as shown in Fig. 1, has, as will be noted, the customer's name and address appearing on the front surface in the usual way, except that the typed characters are formed of carbon or the like applied from the above-mentioned reversed carbon sheet areas or strips, as the result of the above-mentioned unorthodox type impressions which have been transmitted through the card. The left hand end portion of the card, as shown in Fig. 1, comprises a tab which is detachable along a perforated line by the customer for return with the payment of the bill. This tab bears certain mark sensing zones for accounting purposes and which form no part of the present invention.

Figure 2:
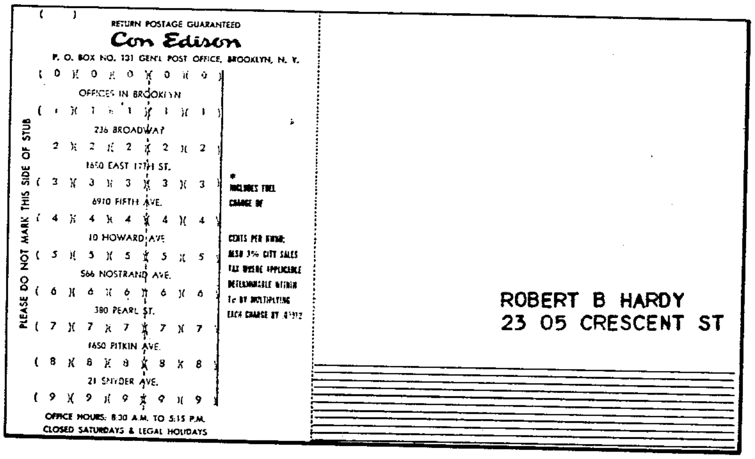
Fig. 2 illustrates the "back" surface of the same bill. The name and address characters are here shown on a cross-hatched area (in reverse) but with one example of the invention such cross-hatching and reverse printing are avoided on the back of the card.

It will be noted that the back surface of the typical postcard bill shown in Fig. 2 has, in addition to the company name and other notations initially printed on the form, four horizontal typed-in lines of billing data, the first such line exhibiting the date and certain account number data, the second line giving the electric meter readings etc. and the corresponding charge for the electricity, the third typed line giving the gas meter readings and corresponding charge, while the fourth of such lines gives the total charge as added on the accounting machine. Certain of this data is repeated on the detachable return tab. These four lines of typing as thus far referred to, are all typed by the accounting machine operating in the conventional way as heretofore. For example in the typical case there may be two punched cards (in some cases a larger number) for each customer, one of which bears punch holes identifying the customer along with other holes representing the data for the electric bill, while another punched card has holes also identifying the same customer and other holes representing the data for the gas bill, and when the billing data from both of these punched cards has been sensed by the machine and typed out, the machine will automatically type out the total charge.

Machines of the above-mentioned 407 form, among others, are equipped with storage facilities for temporarily storing, when desired, selected data when certain of the holes on the punched cards are sensed. In carrying out the method of the present invention for typing a card as shown in Fig. 2, the machine will be set up so as to first sense from one of the punched cards, the holes representing the customer's name and address and transmit this information to the storage means where it remains stored until the total charge figure is typed. The operations controlling the typing of this total may be used with such standard machines automatically to release from storage the information as to the customer's name and address and render such information effective to actuate the proper type carrier means to then properly type such name and address. On the back side of the card as shown in Fig. 2, it will be noted that the name and address on the main part of the card has been printed by type of the above-mentioned mirror-image or unorthodox form and running from right to left, the characters being printed in the cross-hatched area to more or less obliterate the same for avoidance of confusion. (Such cross-hatching was applied in initially printing the card form and the area thereof might, if preferred, be entirely printed black on the back side of the card form as furnished. Also, as hereinafter explained with one example of the invention, this cross-hatching and reverse printing may be eliminated.) Also the name and address characters are printed on the back side of the detachable tab in orthodox manner reading in the usual way from left to right, this being accomplished by other type wheels with orthodox type controlled by circuits connected through the plugboard in the usual way to actuate such standard type concurrently with the actuation of the unorthodox name and address type. The impressions from the unorthodox type, of course, show through on the front of the card, as indicated in Fig. 1, in the form of carbon impressions, readable in the orthodox way and from left to right.

Figure 3:
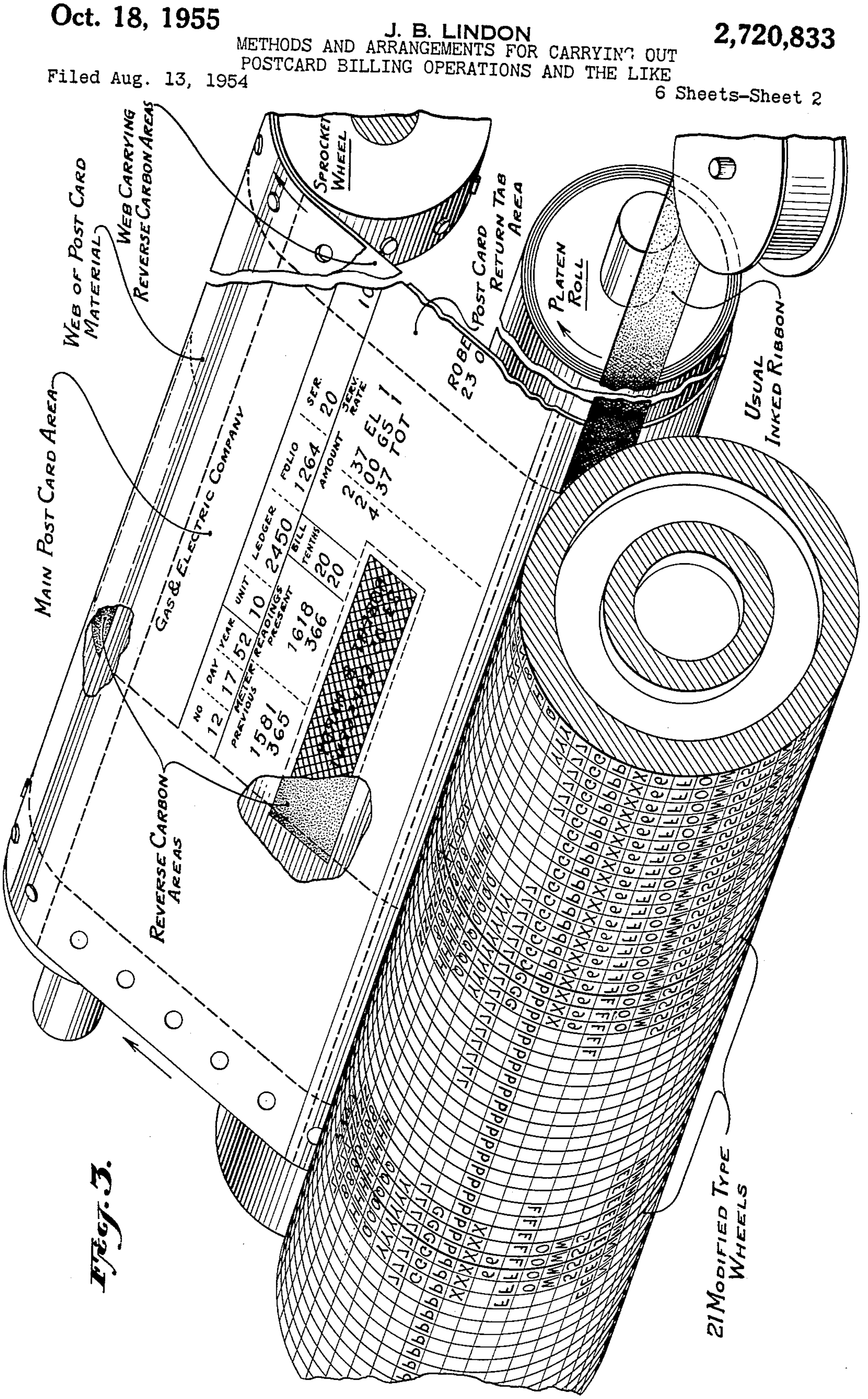
Fig. 3 is a somewhat schematic perspective view illustrating portions of an accounting machine and one method of carrying out the invention.

The perspective view of Fig. 3 shows those parts of an accounting machine which are more particularly concerned with the novel features of the present invention in its simplest form. It will be understood that these portions of the accounting machines and equipment and the operation thereof, which are not herein specifically shown or fully described, are for simplicity omitted, in view of the fact that standard or conventional practices may be followed in regard thereto.

Referring further to Fig. 3, there are here shown somewhat schematically numerous typical type wheels of an accounting machine, those at the two sides of the machine being of standard or orthodox form, while twenty-one of those at the mid-portion of the machine are modified for the purposes of this invention. It is assumed that the usual name and address will not be long enough to require more than twenty-one type wheels to type same, although in some cases experience may show that a greater or lesser number of modified type wheels may be necessary for the purpose. Also in this figure, the platen roll and usual inked ribbon are shown for cooperating with the type wheels to print on a continuous web of thin paper board or the like, which is advanced in the direction shown by the arrows around the platen roll by sprocket wheels which engage in perforations along the sides of the web in the usual way. Such web is made of appropriate material to form postcards suitable for mailing when sections of the web are separated along the perforated lines shown, after the accounting machine has typed the billing data and the customer's name and address on each postcard area.

With the example of the invention shown in Fig. 3, the web of postcard material is backed by a sheet having spaced carbon areas thereon as shown, located at the areas which will correspond to the cross-hatched areas such as shown in Fig. 2, this sheet also being formed with perforations at its edges so that it is fed by the sprockets in the usual way in which carbon sheets may be fed on such accounting machines, except that in this case the carbon areas will face what are to become the front surfaces of the postcards. These carbon areas, as will be noted, are located at areas which will receive impacts from the above-mentioned twenty-one modified type wheels.

Figure 4:
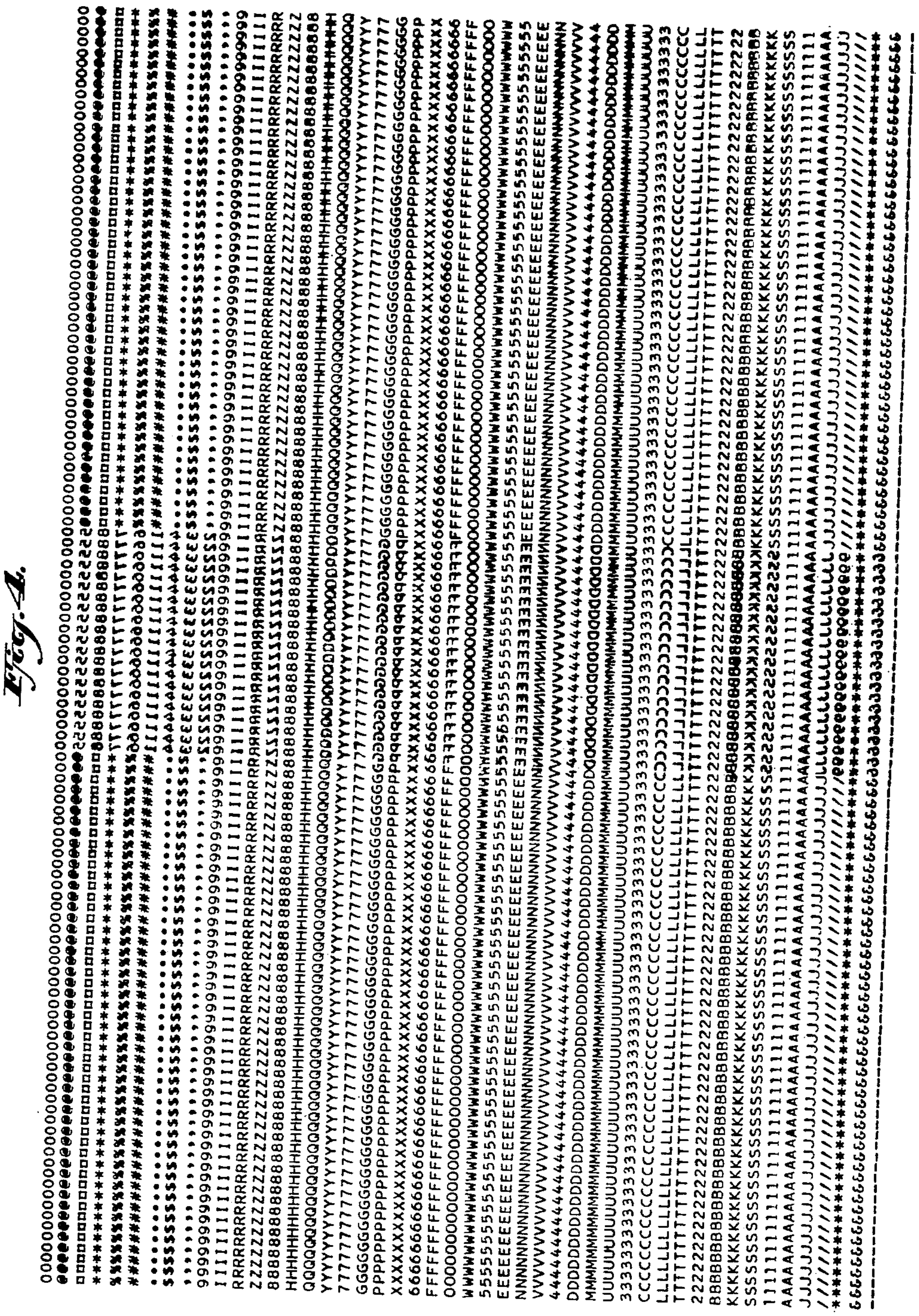
Fig. 4 is a "spacing chart" showing direct impressions from all of the type of all of the type wheels of the above-mentioned 407 form of accounting machine, but with certain of the standard type wheels replaced by others carrying a modified form and arrangement of type for carrying out the invention.

In Fig. 4 there is shown the result of forming direct impressions in the usual way on a piece of paper from all of the type of all of the type wheels of one of the above-mentioned 407 forms of accounting machines of standard construction, except that the middle group, comprising twenty-one vertical lines of typed characters, is in the form obtainable from the above-mentioned twenty-one modified type wheels. The vertical lines of characters as shown in Fig. 4, when read upwardly, show the proper sequence of the type elements on the various type wheels as arranged around on the peripheries of such wheels, starting with "—" and ending with "0." From Fig. 4 it will be noted that the middle group of twenty-one type wheels of standard form have been replaced by modified type wheels on which nine of the arbitrary signs (viz. @□*%#.$,/) have respectively been replaced by certain numerals (viz. 587614329) of the unorthodox or reverse printing form. The "0" type (in the top line) being readable either way, did not need to be reversed. Also on these twenty-one modified type wheels, it will be noted that all of the normal alphabetical characters have been reversed to the unorthodox form, although remaining in the same relative places as on the standard type wheels. Further it will be noted that the numerical characters, such as on the standard type wheels of this form of machine (from 1–9 inclusive), all remain the same and in the same places on each of the substituted twenty-one type wheels.

Thus these standard nine numerical characters as well as the zeros, all being located at their conventional positions and being standard in form, may still be used in the conventional way for typing the billing data on the postcards. And since the operating mechanism for controlling the typing of these numerals does not need to be altered, any and all accounting mechanism which is arranged to be operated in conjunction therewith may remain of standard form. On the other hand, the reversed numerical type which is substituted for certain of the arbitrary signs, and also the reversed alphabetical characters, may be utilized to print the numerals of the street addresses and the customers' names and the street names, independently of and without interfering with the accounting mechanism which controls the standard numerical characters, so that the latter remain useable as before for typing the bill data. Yet, as will be apparent from Fig. 2, certain of the billing numerals (with the convenient arrangement of the bill there shown) will occur in vertical alignment with certain of the letters and numerals of the name and address which are typed or impressed in reverse on the back surface of the card. And since all of the characters which are thus arranged along one vertical line, must be typed from type mounted on the same type carrier means or member, the above-described modification of the type of each such carrier member, provides an ideal and simple arrangement making this result possible. That is, the arbitrary signs, which are not essential for postcard bills and the like, are eliminated and replaced by the reverse numeral characters necessary for address purposes, making it possible to leave the standard numerical characters in standard positions respectively, and operative in the conventional way. Furthermore, the standard orthodox alphabetical characters, not being essential for any typing on the back of the main part of the postcard, are replaced by the reverse or unorthodox alphabetical characters for typing the address in conventional legible form on the face of the postcard while leaving other conventional alphabetical type (which type on the back of the detachable tab in the example shown) all in the conventional positions and form.

The modified type wheels or type carrier means with type as shown at the mid-portion of Fig. 4, may be quite easily and rapidly installed in place of the usual or standard type carrier members, by the operators of such accounting machines, when it is desired to arrange the machine to practice the present invention therewith; and the modified type carrier members may be readily replaced by the standard members when it is desired to restore the machine to a condition for use for other purposes. However, as above explained, whenever the standard type-carrier members are replaced by the modified members or vice versa, control circuits therefor at the plugboard of the machine should be altered by rearranging the plugs so that, for example, a given set of punched holes representative of a name and address on punched cards fed through the machine, will cause the characters of such name and address to be typed for reading the name and address from right to left as viewed on the back surface of the postcard, whereas when the modified type wheels are replaced by those of standard form, the plugs will be restored to standard positions for typing characters to be read from left to right when typed in the conventional way.

Figure 7:
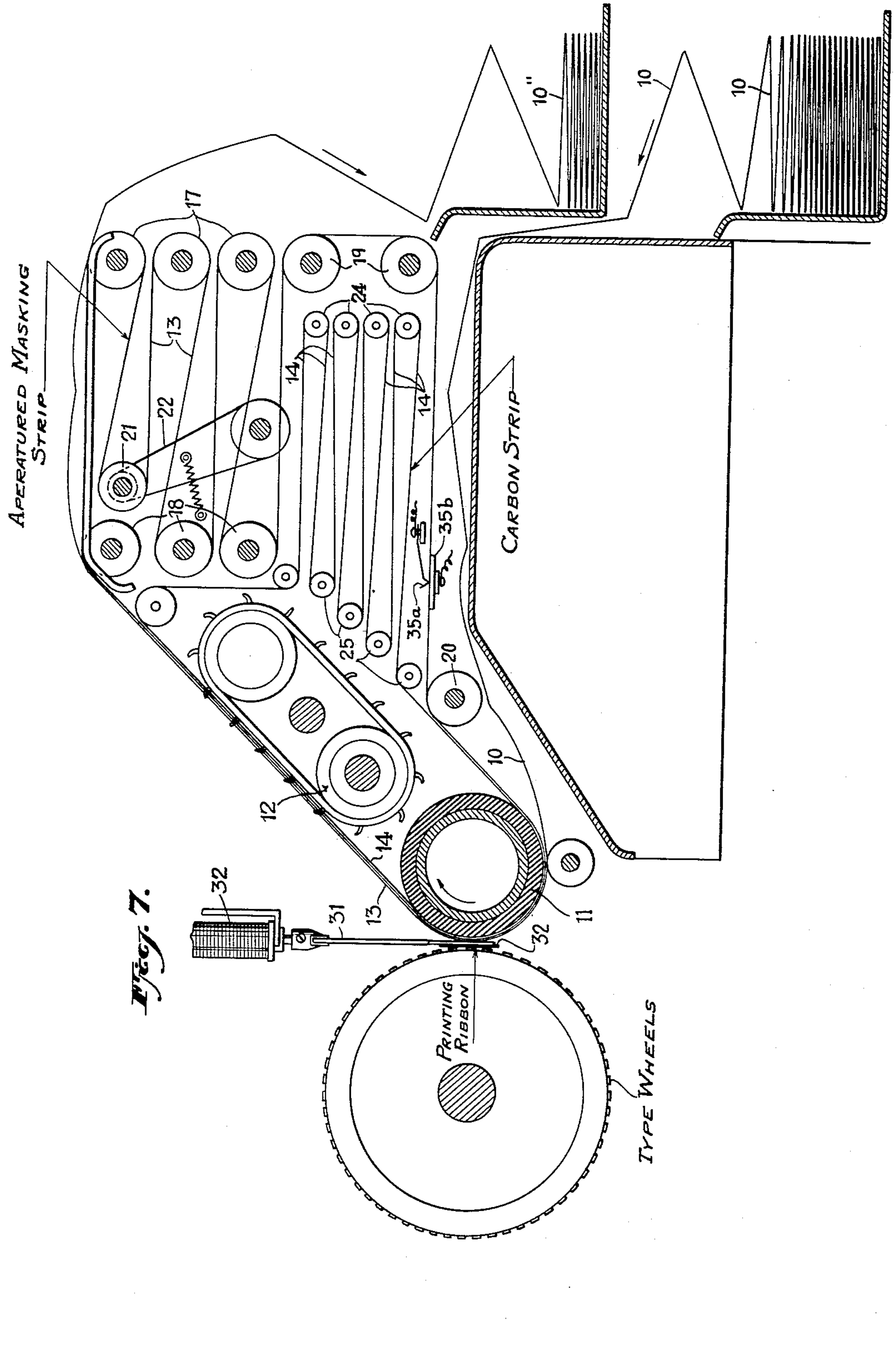
Fig. 7 is a vertical sectional view, schematically showing parts of apparatus such as shown in Fig. 3 but illustrating a modified embodiment of the invention.
Figure 8:
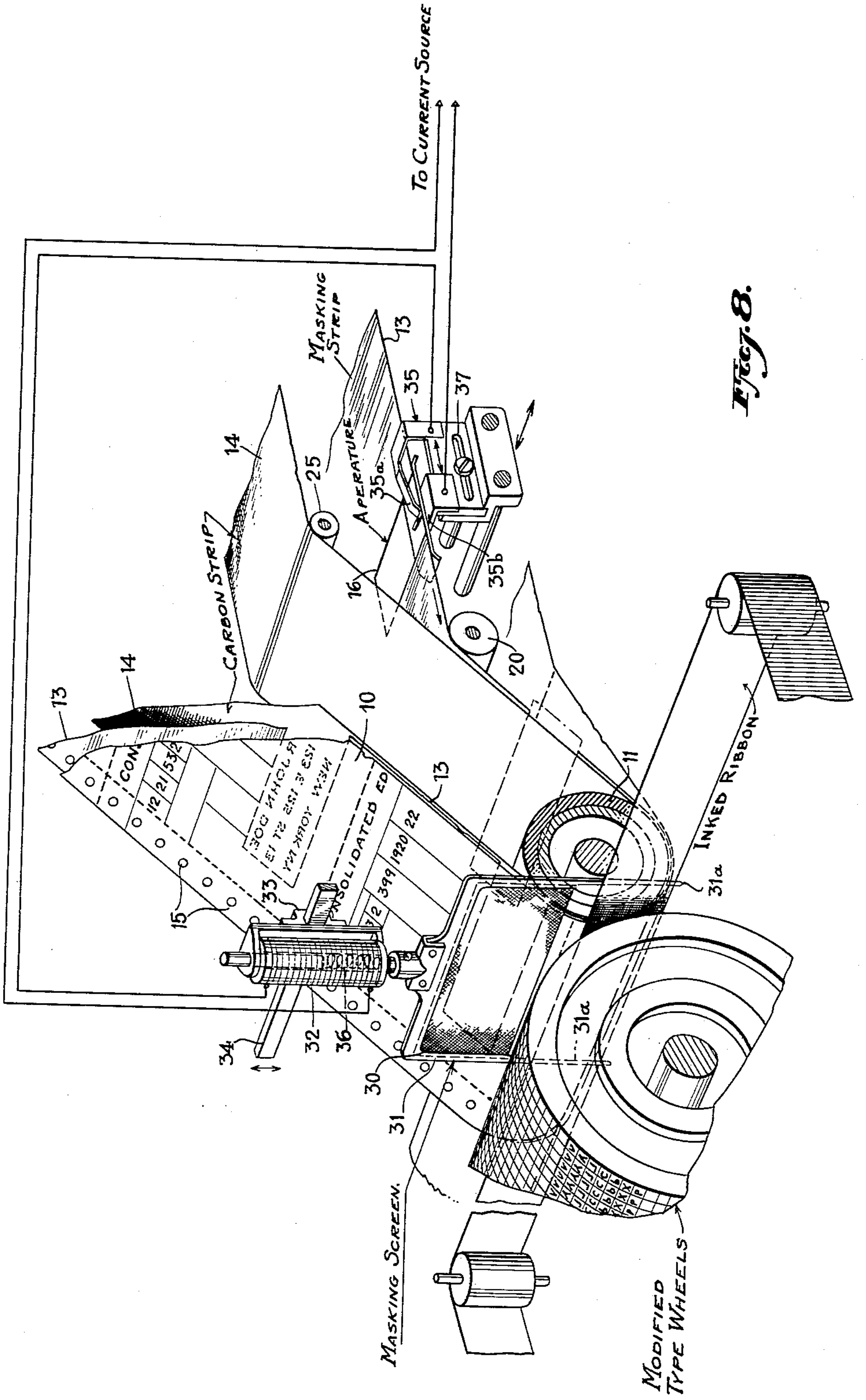
Fig. 8 is a perspective view partly broken away and schematically showing further details of the embodiment of Fig. 7.

Referring to the embodiment of the invention shown in Figs. 7 and 8, the arrangement as here shown embodies two improved features. That is, first, instead of using a web of paper carrying reverse carbon areas, a single relatively narrow carbon-bearing strip may be used, having thereon a continuous band of carbon or the like of a width approximating the width of the desired name and address areas to be printed, and this strip is advanced in such manner that from time to time all of the carbon surfaces thereon will be utilized instead of confining the useful parts to predetermined carbon areas as in the above-described arrangement of Fig. 3. Secondly, the arrangement of Figs. 7 and 8 permits the name and address, as imprinted in reverse type as per Fig. 1, to be eliminated from the back of the postcard bills so that no cross-hatched or obscuring areas or the like need be used on the main part of the back of the bill. That is, means is provided for shielding the back of the card from the inked ribbon at times when the name and address is being imprinted on the front of the card as shown in Fig. 2.

Referring now to Fig. 7 in further detail, the strip of separable postcard bills, as indicated at 10, is arranged to travel through the machine from a folded stack 10′ thereof around the platen roller 11, the strip being advanced by conventional sprocket means as indicated at 12, for return to a stock 10″. Thus the web of postcard material may be advanced through the machine in the same way as in Fig. 3 and in the conventional way in which corresponding webs are advanced through machines of this type.

Underneath the web 10, a masking strip 13 and also the carbon-bearing strip 14 are advanced along with the web 10 around the platen roll 11. Both this masking strip and the carbon-bearing strip may be formed with sprocket receiving perforations along both sides thereof at the same locations where the perforations occur in the postcard web, so that these strips will be advanced around the platen roll in fixed relation to the web of postcard material. (The right-hand portions of web 10 and adjcent portions of masking strip and of the machine are cut away in Fig. 8 for clearness.) The carbon strip is run through the machine with its carbon-bearing surface facing the underside of the web of postcard material and the masking strip is interposed therebetween and has apertures, as indicated for example at 16, Fig. 8, at each area corresponding to the name and address areas on the successive postcard bills. The masking strip may, for example, be formed of a suitable transparent flexible but preferably non-stretchable cellophane or the like material and acts to mask the carbon areas on the carbon strip against touching the front of the postcards at all areas except the areas which are to bear the names and addresses.

As indicated in Fig. 7, the masking strip 13 which preferably comprises a continuous band, may run over a series of supporting rollers as at 17, 18, 19 and 20, also a roller 21 carried by a spring pressed arm 22 for holding the strip in somewhat tensioned condition. The arrangement of rollers 17–21, inclusive, is made such that the continuous masking strip will have a total path of travel of a length enabling it to be advanced by the same sprocket means 12 which advances the postcard web and with the successive apertures of the masking strip respectively occurring, when at the printing position, at the name and address areas on the postcard web.

The continuous reverse carbon strip 14 is arranged to pass over a series of rollers as at 24, 25, and so as to have a total path of travel such that as each area thereof on successive occasions arrives on the printing position, such area will be either somewhat advanced or retarded as compared with its location during its preceding cycle of travel, thereby to insure that all of the carbon areas are from time to time economically used. That is, with such a carbon strip accompanied by the masking strip, there is a considerable saving of expense as compared with the cost of a web bearing only spaced carbon areas, as shown in Fig. 3. Yet, notwithstanding the continuity of the carbon on the strip 14, the masking strip will prevent it from printing anything on the front of the postcards except at the desired name and address areas.

In order to eliminate the reverse printing of the names and addresses on the backs of the cards, a masking screen 30, as best shown in Fig. 8, is caused to be lowered from a normal position to a position in between the inked ribbon and the back surface of the web of postcard material whenever the latter web is at a position for the operation of printing the names and addresses. The screen 30 may be formed of a suitable thin cellophane-like material or of a webbing such as used for inked typewriter ribbons but having thereon no ink. This screen may be retained for example, in a metal frame such as indicated at 31, and is adapted to be raised and lowered at the proper times. If desired, the lower portions of the ends of this frame may have thin metal extensions, as at 31*a*, normally extending down in back of the inked ribbon and serving as guides for enabling the screen to slide in between the inked ribbon and the postcard web when desired.

The screen 30 may be operated automatically by various forms of means to bring same down into active position whenever a name or address is to be printed, and so that when the type of the modified type wheels are actuated the impacts thereof against the inked ribbon cannot cause any printing on the backs of the postcards. Yet the screen 30 is sufficiently yieldable to transmit such impacts therethrough and through the postcard material to the carbon strip 14, whereby such impacts do print the name and address correctly on the front surfaces of the cards. In the example shown, the screen 30 is operated by solenoid 32, having its plunger connected to the frame 31. This solenoid may be mounted on a suitable means such as a transversely adjustable bracket 33 carried by a vertically adjustable supporting rod 34. The circuit of the solenoid is in series with a switch at 35 as shown, having contacts 35*a*, 35*b* adapted to come together whenever an aperture as at 16 occurs therebetween in the apertured masking strip 13, as will be readily apparent from Fig. 8. The solenoid plunger may be normally held in its upper position as by a spring 36 but whenever the contacts 35*a*, 35*b* come together the solenoid will be actuated to lower the masking screen 30 to active position, but only for so long as portions of a name and address area on the postcard web are located at the printing positions. The contact assembly 35 may be mounted on supporting means as at 37 which is adjustable in directions parallel to the movement of the apertured masking strip 13, to thereby adjust the timing of the operation of the solenoid.

In some cases, the reverse printed cross-hatched or obscured address area, as appears in Fig. 1 on the back of the postcard bill, may be considered unsightly or confusing but with the arrangement above-described in connection with Figs. 7 and 8 this area is left blank.

In respects other than above described, the construction and operation of the arrangement of Figs. 7 and 8 may be the same as above described in connection with Fig. 3, or as with known accounting machines of the type shown.

Although a preferred embodiment of the invention is herein disclosed for purposes of explanation, various other modifications thereof, after study of this specification, will be apparent to those skilled in the art to which the invention pertains. Reference should accordingly be had to the appended claims in determining the scope of the invention.

What is claimed is:

1. Method for preparing postcard bills and the like on an electrically operated accounting machine of the character controlled by punched cards having punch holes representative of the billing data and the customer's address, to type in one operation billing data on the back surfaces of the postcards and address data on the front thereof, which method comprises: arranging the machine with type carrier means for the particular region where address data is to be typed, with modified typing means for representing address characters shaped as per the mirror image of orthodox type; arranging the control circuits in the machine for said type carrier means for actuating same responsive to sensing said punch holes to type said address characters as if for reading from right to left; feeding the postcards through the machine with the back surfaces thereof facing the type carrier means and with a strip bearing carbon or the like exposed to and contacting with the region on the front of each postcard where the address is to be typed; feeding the punched cards through the machine in conventional manner to cause the machine to type the billing data on the back surface of the postcards in conventional manner and to cause said modified type means as actuated in accordance with the address data sensed on the punched cards to apply impressions to the back surfaces of the postcards, which impressions are transmitted through the cards to said carbon, which in turn causes carbon impressions to be typed on the front surfaces of the postcards in the form of orthodox characters readable from left to right.

2. Method for operating an electrically actuated accounting machine controlled by punched cards having punch holes representative of data to be typed, to type certain of such data on the "back" surface of a sheet and other parts of such data on the "front" thereof, which method comprises: arranging the machine with type carrier means for the particular region where said other parts of the data are to be typed, with modified typing means representing characters shaped as per the mirror image of orthodox type; arranging the control circuits in the machine for said type carrier means for actuating same responsive to sensing said punch holes to type said other parts of the data as if for reading from right to left; feeding the sheet to be typed through the machine with the "back" surface thereof facing the type carrier means and with a strip bearing carbon or the like exposed to and contacting the region on the "front" of said sheet where said other parts of the data are to be typed; feeding the punched cards through the machine in conventional manner to cause the machine to type certain of the data on the "back" surface of said sheet in the conventional manner and to cause said modified typing means as actuated in accordance with the other parts of said data sensed on the punched card to apply impressions to said "back" surface, which impressions are transmitted through to said carbon which in turn causes carbon impressions to be typed on the "front" of said sheet in the form of orthodox characters readable from left to right.

3. Method for preparing postcard bills and the like on an electrically operated accounting machine of the character having data storage means and controlled by punched cards having punch holes representative of the billing data and the customer's address, to type billing data on the back surfaces of the postcards and address data on the front thereof, which method comprises; arranging the machine with type carrier members for the particular region where address data is to be typed, with modified type representing address characters shaped as per the mirror image of orthodox type; arranging the control circuits in the machine for said type carrier members for actuating same responsive to sensing said punch holes to type said address characters as if for reading from right to left; feeding the postcards through the machine with the back surfaces thereof facing the type carrier members and with a strip bearing carbon or the like exposed to and contacting the region on the front of each postcard where the address is to be typed; feeding the punched cards through the machine in conventional manner to cause the machine to type the billing data on the back surface of the postcards in the conventional manner; meanwhile utilizing the storage means of the machine to store the address data sensed from the punched cards until the typing of the billing data is completed, the machine being set to thereupon release such stored data and to cause same to actuate said modified type in accordance with the address data sensed on the punched cards, to apply impressions to the back surfaces of the postcards, which impressions are transmitted through to said carbon which in turn causes carbon impressions to be typed on the front surfaces of the postcards in the form of orthodox characters readable from left to right.

4. Method for preparing postcard bills and the like on an electrically operated accounting machine of the character having numerous type carrier members controlled by punched cards having punch holes representative of the billing data and the customer's address, to type in one operation billing data on the back surfaces of the postcards and address data on the front thereof, which method comprises: arranging certain of the type carrier members with orthodox numerical and alphabetical type and a plurality of others with a set of orthodox numerical type and also type representing the numerical and alphabetical address characters shaped as per the mirror image of orthodox type; feeding the postcards into the machine with the back surfaces thereof facing the type carrier members and with a strip bearing carbon or the like contacting the region on the front of the postcards where the address is to be typed; and feeding the punched cards through the machine in conventional manner to cause the machine to actuate said orthodox type for typing the billing data on the back surfaces of the postcards in the conventional manner and to cause said modified unorthodox type as actuated in accordance with the address data sensed on the punched cards to apply impressions to the back surfaces of the postcards, which impressions are transmitted through to said carbon which in turn causes carbon impressions to be typed on the front surfaces of the postcards in the form of characters of orthodox appearance.

5. Method for preparing postcard bills and the like on an electrically operated accounting machine of the character controlled by punched cards having punch holes representative of the bill data and the customer's address, to print billing data on the back surfaces of the postcards and address data on the front thereof, which method comprises: arranging the machine as if to print, on the back of the particular region where address data is to be located, modified characters representing the address and shaped as per the mirror image of orthodox characters; also arranging the control circuits in the machine to operate responsive to sensing said punch holes to print said address characters as if for reading from right to left; feeding the postcards through the machine with the back surfaces thereof facing the typing means and with a carbon bearing means or the like exposed to and contacting with the region on the front of each postcard where the address is to be located; and feeding the punched cards through the machine in conventional manner to cause the machine to apply the billing data on the back surface of the postcards in conventional manner and to cause the typing means which is actuated in accordance with the address data sensed on the punched cards to apply impressions to the back surfaces of the postcards, which impressions are transmitted through the cards to said carbon, which in turn causes carbon impressions to be typed on the front surfaces of the postcards in the form of orthodox characters readable from left to right.

6. Method for preparing postcard bills and the like on an electrically operated accounting machine of the character controlled by punched cards having punch holes representative of the billing data and the customer's address, to print billing data on the back surfaces of the postcards and address data on the front thereof, which method comprises: arranging the machine as if to print, on the back of the particular region where address data is to be located, modified characters representing the address and shaped as per the mirror image of orthodox characters; also arranging the control circuits in the machine to operate responsive to sensing said punch holes to print said address characters as if for reading from right to left; feeding the postcards through the machine with the back surfaces thereof facing the typing means and together with a strip bearing carbon or the like facing the front of each postcard, while interposing and feeding an apertured masking strip between the postcards and the carbon-bearing strip, with the apertures of such masking strip located at areas where the address characters are to be printed on the front of the postcards; and feeding the punched cards through the machine in conventional manner to cause the machine to apply the billing data on the back surface of the postcards in conventional manner and to cause the typing means which is actuated in accordance with the address data sensed on the punched cards to apply impressions to the back surfaces of the postcards, which impressions are transmitted through the cards and through the apertures to said carbon, whereby such carbon causes impressions to be typed on the front surfaces of the postcards in the form of orthodox characters readable from left to right, the masking strip acting to prevent the carbon from printing billing data on the front of the surfaces of the postcards.

7. Method for preparing postcard bills and the like on an electrically operated accounting machine having an inked ribbon and accompanying typing means of the character controlled by punched cards having punch holes representative of the bill data and the customer's address, which method comprises: arranging the machine as if to print, on the back of the particular area where address data is to be typed, modified characters representing the address and shaped as per the mirror image of orthodox characters; also arranging the control circuits in the machine to operate responsive to sensing said punch holes to print said address characters as if for reading from right to left; feeding the postcards through the machine with the back surfaces thereof facing the typing means and with a carbon-bearing means or the like exposed to and contacting with the region on the front of each postcard where the address is to be located; and feeding the punched cards through the machine in conventional manner to cause the machine to apply the billing data on the back surface of the postcards in conventional manner, then inserting a screen between the inked ribbon and the back of said area where address data is to be typed, whereby the part of the typing means which is actuated in accordance with the address data sensed on the punched cards applies impressions through the ribbon and screen to the back surfaces of the postcards, which impressions are transmitted through such cards to said carbon, which in turn causes carbon impressions to be typed on the front surfaces of the postcards in the form of orthodox address characters readable from left to right.

8. In an electrically operated accounting machine of the character controlled by punched cards having punch holes representative of data to be typed onto an account sheet or the like by the machine, the combination comprising: means on the machine for carrying the account sheets in position for receiving type impulses and superposed over a carbon-bearing sheet or strip; a plurality of type carrier means having numerical type of orthodox form and adapted to be actuated by the control circuits of the machine responsive to sensing of such punch holes to type information onto the back surface of such sheet in the form of orthodox characters readable from left to right; and another plurality of type carrier means also having numerical type of orthodox form adapted for similarly typing orthodox numerical information on the back of the sheet, said other plurality of carrier means also having modified alphabetical and numerical type shaped as per the mirror image of orthodox type and arranged to be actuated by the control circuits of the machine responsive to sensing of corresponding punched holes in the punched cards to apply impressions to the back surface of the sheet, which impressions when transmitted through the sheet will be in the form of orthodox characters running from left to right and printable by the carbon-bearing sheet or strip onto the front surfaces of the account sheet.

9. In an electrically operated accounting machine of the character controlled by punched cards having punch holes representative of data to be typed onto an account sheet or the like by the machine, the combination comprising: means on the machine for feeding the account sheet past the position for receiving type impulses, means for feeding through the machine a continuous sheet or strip bearing carbon or the like for contact with the "front" surface of said sheet; a plurality of type carrier means having numerical type of orthodox form and adapted to be actuated by the control circuits of the machine responsive to sensing of such punch holes to type information onto the "back" surface of such sheet in the form of orthodox characters readable from left to right; another plurality of type carrier means also having numerical type of orthodox form adapted for similarly typing orthodox numerical information on the "back" of the sheet, said other plurality of carrier means also having modified alphabetical and numerical type shaped as per the mirror image of orthodox type and arranged to be actuated by the control circuits of the machine responsive to sensing of corresponding punched holes in the punched cards to apply impressions to the "back" surface of the sheet, which impressions when transmitted through the sheet will be in the form of orthodox characters running from left to right and printable by the carbon-bearing sheet or strip onto the "front" surfaces of the account sheets; and means for feeding along with the account sheet past the area of printing a continuous apertured masking strip interposed between said sheet and the carbon-bearing strip, such latter feeding means being so synchronized with the sheet feeding means that the apertures of the masking strip occur at the areas where said orthodox characters are to be printed onto the "front" surfaces of the sheets and whereby other areas on said front surfaces are masked from contact with the carbon.

10. In an electrically operated accounting machine having an inked ribbon and accompanying typing means of the character controlled by punched cards having punch holes representative of billing data and of customers' addresses: means on the machine for feeding bill sheets to positions for receiving typed impressions, means for also feeding to said positions and in under said sheets a continuous strip bearing carbon or the like, further means for feeding a continuous apertured masking strip through the machine in a position interposed between the billing sheets and the carbon strip to mask the carbon against contact with the front of the billing sheets except at the aperture areas of the masking strip; a plurality of type carrier means for printing billing data on the back of the billing strip in orthodox form under the control of circuits of the machine and responsive to sensing of the punched cards; and another plurality of type carrier means which has at least partially modified alphabetical and numerical character printing means shaped as per the mirror image of orthodox type and arranged to be actuated by the control circuits of the machine as if to type from right to left responsive to sensing of corresponding punch holes in the punched cards representing the customers' addresses, and to apply impressions to the back surface of the billing sheet, which impressions are transmitted through the sheet, through said apertures and on to said carbon strip, whereby the carbon causes orthodox address characters readable from left to right to be formed on the front of the sheets.

11. Apparatus in accordance with claim 10 and in which there is provided a masking screen movable into and out of an active position between the inked ribbon and the back surfaces of the sheets, and means for automatically moving said screen into its said active position responsive to the location of each aperture of the masking strip at the typing position, such screen serving to prevent typing of the address characters onto the back of the sheets while allowing the address character impressions to be transmitted therethrough.

12. Apparatus in accordance with claim 10 and in which there is provided a masking screen automatically movable in between the inked ribbon and the sheets when said address characters are being formed, to prevent typing of same on the back of the sheets while permitting the impressions therefor to be transmitted through to the front of the sheets.

References Cited in the file of this patent

UNITED STATES PATENTS

| | | |
|---|---|---|
| 1,902,060 | Dechene | Mar. 21, 1933 |
| 2,035,768 | Sherman | Mar. 31, 1936 |
| 2,060,190 | Foster | Nov. 10, 1936 |
| 2,111,121 | Mills | Mar. 15, 1938 |
| 2,163,958 | Neidich | June 27, 1939 |
| 2,200,932 | Neidich | May 14, 1940 |
| 2,209,586 | Swift | July 30, 1940 |
| 2,582,149 | Newman | Jan. 8, 1952 |